Figure 4:
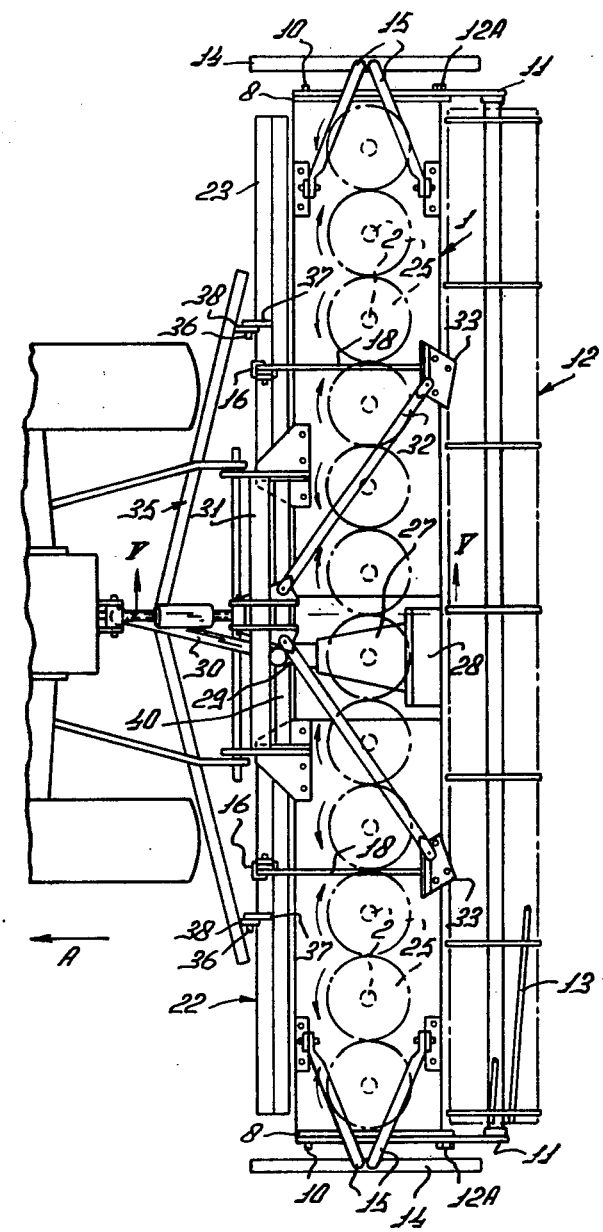

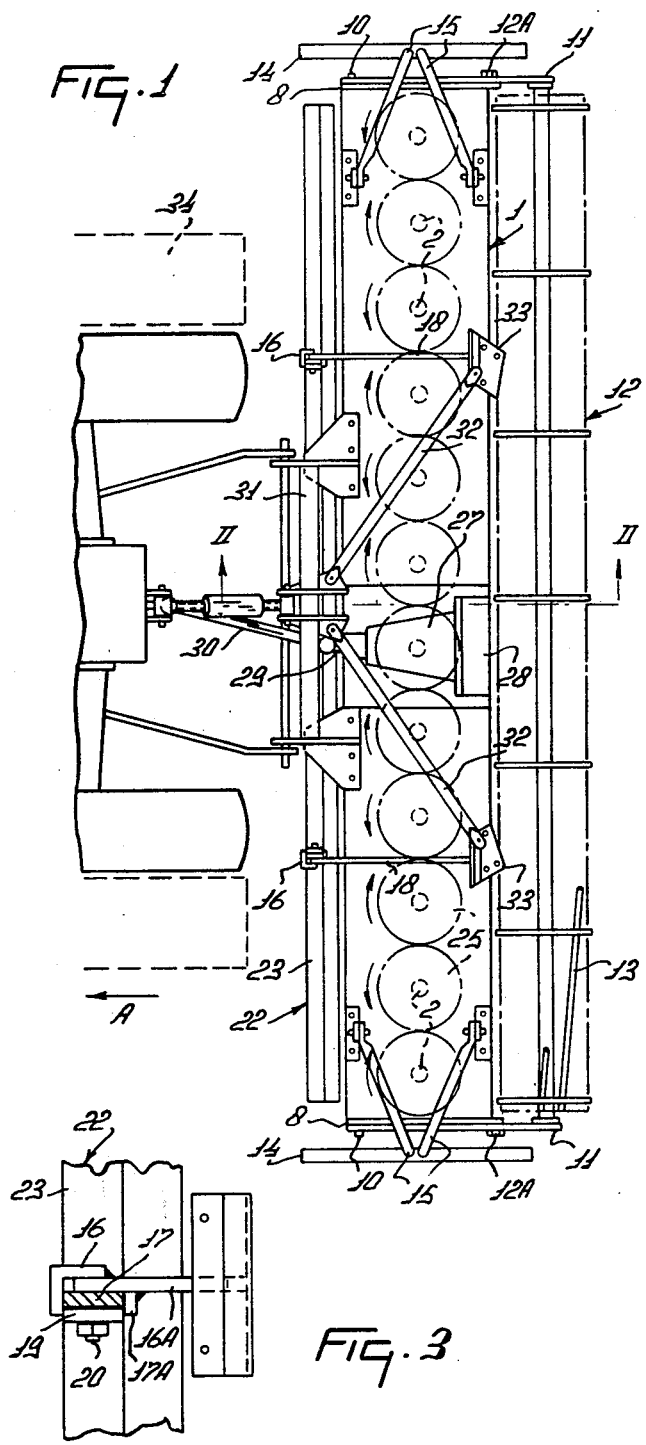

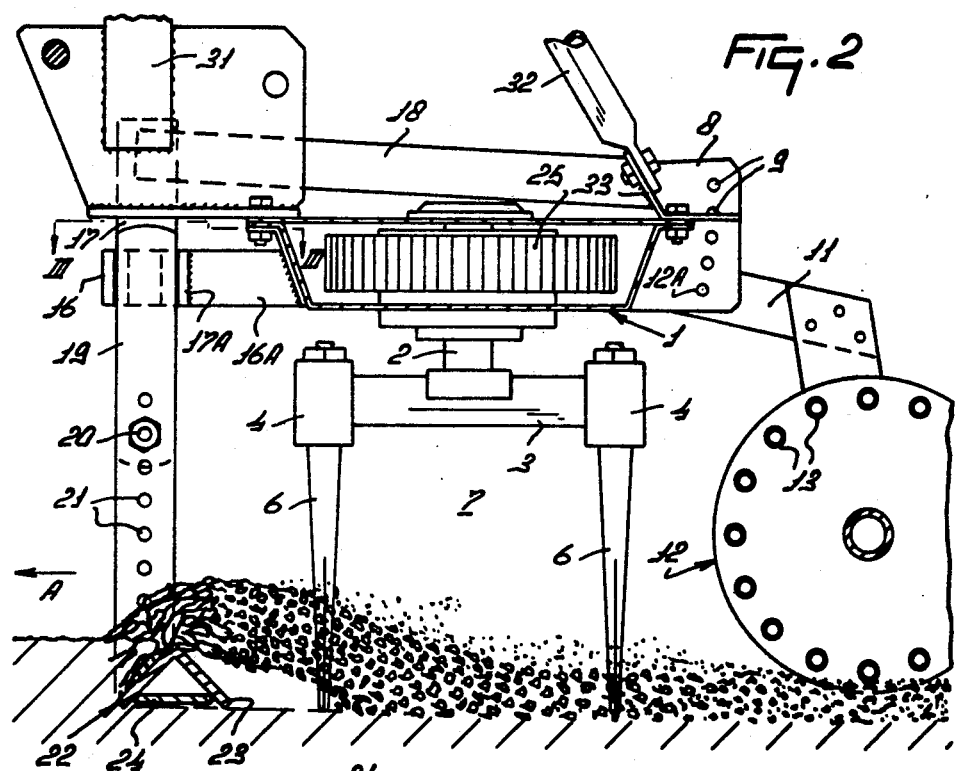
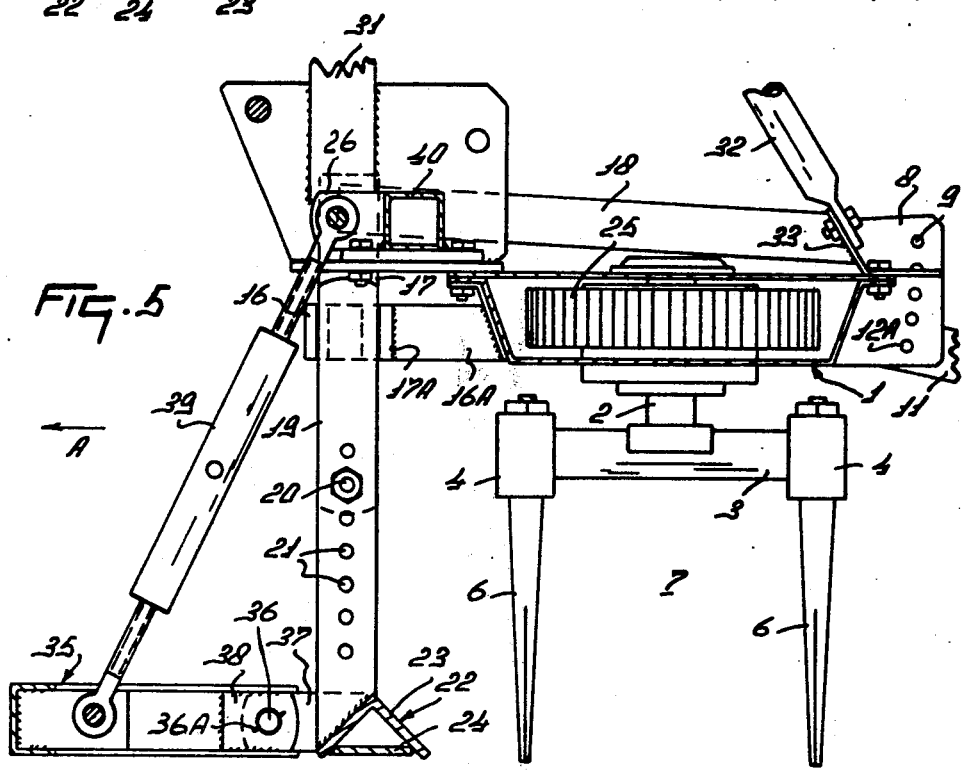

SOIL CULTIVATING IMPLEMENTS

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, the implement being shown in operation, FIG. 3 is a section taken on the line III—III in FIG. 2, FIG. 4 is a plan view of the same implement as that illustrated in FIG. 1 but shows the provision of an additional member, and FIG. 5 is a section, to an enlarged scale, taken on the line V—V in FIG. 4.

Referring to FIGS. 1 to 3 of the accompanying drawings, the soil cultivating implement that is illustrated is in the form of a rotary harrow and comprises a hollow box-shaped frame portion 1 that extends substantially horizontally transverse, and normally substantially horizontally perpendicular, to the intended direction of operative travel of the implement which is indicated by an arrow A in FIGS. 1 and 2 and also in FIGS. 4 and 5. The frame portion 1 rotatably supports a plurality (in this case, twelve) of vertical or substantially vertical shafts 2 whose axes are spaced apart from one another along said frame portion at regular intervals which conveniently, but not essentially, have magnitudes of substantially 25 centimeters. Each shaft 2 project from beneath the bottom of the frame portion 1 and is there provided with a corresponding rotary soil working or cultivating member 7. Each member 7 comprises a horizontal or substantially horizontal support 3 that is perpendicularly fastened at its midpoint to the lowermost end of the shaft 2 concerned, said support 3 having sleeve-like tine holders 4 rigidly secured to its opposite ends in such a way that the longitudinal axes of said holders 4 are in substantialy parallel relationship with the axis of rotation of the corresponding shaft 2. The tine holders 4 receive fastening portions of corresponding rigid tines 6, each tine 6 having a straight soil working portion that tapers downwardly from substantially the lowermost end of the corresponding holder 4 in gently rearwardly inclined or "trailing" relationship with the intended direction of operative rotation of the member 7 of which the tine 6 concerned forms a part (see the arrows in FIG. 1 of the drawings).

The opposite ends of the hollow frame portion 1 are closed by corresponding plates 8 and arms 11 are turnable upwardly and downwardly alongsidse those plates 8 about substantially horizontal axis that is afforded by aligned strong pivots 10 located at the tops and fronts of the end plates 8 with respect to the direction A. The arms 11 extend rearwardly from their pivotal mountings and their rear ends, which project beyond the plates 8, carry downwardly inclined brackets (see FIG. 2). Horizontally aligned bearings that are carried by the brackets at the ends of the arms 11 rotatably connect a supporting member 12, in the form of an open ground roller, to the arms 11 and thus indirectly to the frame portion 1. The supporting member 12, which is freely rotatable, comprises a central, preferably tubular, member to which a plurality (such as seven) of generally circular vertically disposed plates are secured at regular intervals along the length thereof. Peripheral regions of the vertical plates are formed with a plurality (such as sixteen) of holes through which a similar number of elongated rod-formation, or tube-formation as illustrated, elements 13 are entered at regularly spaced apart intervals around the axially disposed central member, said elements 13 preferably, as illustrated, being wound helically around the axis of rotation of the member 12 to some extent. If desired, the elements 13 may extend substantially parallel to the longitudinal axis/axes of rotation of the member 12.

The arms 11 by which the member 12 is connected to the frame portion 1 are turnable upwardly and downwardly about the aligned pivots 10 at the tops and fronts of the end plates 8 and are provided with bolts 12A that can be entered in chosen ones of curved rows of holes 9 that are formed alongside the broad (from top to bottom) rear edges of the end plates 8 at equal distances from the axis defined by the strong pivots 10. The particular holes 9 that are chosen for co-operation with the bolts 12A determine the level of the axis of rotation of the supporting member 12 relative to the frame portion 1, this being a principal factor in determining the maximum depth of penetration of the tines 6 of the soil working or cultivating members 7 into the ground which is possible during the use of the implement. In addition to performing its supporting function, the member 12 effects a gentle smoothing and compressing action upon the surface of the soil that has been worked by the immediately foregoing tines 6 during the use of the implement. Moreover, the member 12 will crush any large lumps of soil that may have been left upon the surface thereof by the tines of the members 7.

The members 7 extend in a single row that is substantially horizontally perpendicular to the direction A and, beyond the opposite ends of that row, substantially vertically disposed shield plates 14 are arranged in parallel relationship with the direction A, each shield plate 14 being turnable upwardly and downwardly, to match undulations in the surface of the ground that its lower edge may meet during operative progress in the direction A, about a corresponding substantially horizontal axis that is substantially parallel to the direction A and that is afforded by corresponding pivots mounted on top of the frame portion 1 at a short distance inwardly towards the center of the implement from the corresponding end plate 8. The connection between each shield plate 14 and the corresponding pair of pivots is afforded by a pair of arms 15 that initially extend upwardly from the upper edge of the corresponding plate 14 in closely adjacent or adjoining relationship whereafter said arms 15 diverge towards their respective pivots as can be seen in FIG. 1 of the drawings. The shield plates 14 minimise ridging of the soil at the opposite edges of the broad strip of land which the members 7 cultivate during the use of the implement and also act substantially to prevent stones and like potentially dangerous items from being flung laterally from the path of travel of the implememt by the tines 6 of its rapidly rotating soil working or cultivating members 7.

Substantially vertically disposed supports 17 extend downwardly from the frame portion 1 at two locations which are just in front of that frame portion with respect to the direction A at similar distances towards the center of the frame portion from its opposite end plates 8. Each support 17 is lodged between corresponding guides 16 and 17A, each pair of guides 16 and 17A being the distance between the axes of rotation of immediately neighbouring shafts 2 so that the strips of land which are worked by individual members 7 overlap one another. The soil working member 22 at the front of the implement is disposed immediately in advance of the row of rotary soil working or cultivating members 7 so as to co-operate with those members 7. The soil guide that is afforded by the leading limb of the bar 23 of the soil working member 22 scrapes off a layer of top soil which preferably has an average depth of between substantially 2 and substantially 3 centimeters as illustrated in FIG. 2 of the drawings and, with a sufficient forward speed of the implement in the direction A, the scraped off soil passes rearwardly over the top of the member 22 and falls into the working area of the tines 6 of the immediately following members 7. The displaced soil is finely and substantially evenly crumbled by the tines 6 and is left lying in that condition on top of an underlying soil layer whose upper surface has been compressed to some extent by the passage thereover of the bottom of the foregoing soil working member 22. This surface of the underlying soil layer thus forms the base of the seed bed which is prepared by the implement. The overlying layer that has been crumbled by the tines 6 of the members 7 is gently compressed by the passage thereover of the ground roller that affords the rotatable supporting member 12 and, as previously mentioned, that roller will crush any large lumps of soil that may exceptionally have escaped crumbling by the tines 6. Sugar beet seed can be sown in the prepared bed in a separate and subsequent operation or, advantageously, by a seed drill connected to the rear of the soil cultivating implement that has been described. The anchorage plates 33 at the top and rear of the frame portion 1 comprise coupling points which may be used in connecting a seed drill to the rear of the implement.

Whether or not the sugar beet seed is sown in a simultaneous operation, the seed drill which performs that operation is set to deposit the seeds at substantially the bottom of the uppermost crumbled and relatively loose layer of top soil so that they will lie substantially on the base of that layer, which base has been formed in the manner described above. The use of the implement that has been described with reference to FIGS. 1 to 3 of the drawings enables a seed bed to be prepared in a simple manner, usually with a single traverse of the implement, the seed bed comprising an upper relatively thin, relatively finely divided and relatively loose top soil layer and an underlying relatively firm base. A seed bed of this kind provides optimum conditions for the germination of sugar beet seeds and the subsequent growth of the young plants. In order to avoid the formation of deep wheel tracks by the tractor or other vehicle which operates the implement, it is desirable that said tractor or other vehicle should be provided with so-called cage wheels 34 as illustrated diagrammatically in broken lines in FIG. 1 of the drawings. However, if, for any reason, the provision of cage wheels is not possible, the modified construction illustrated in FIGS. 4 and 5 of the drawings may be employed to obliterate the wheel tracks or considerably reduce their effect.

Referring to FIGS. 4 and 5 of the drawings, the implement that is illustrated therein is substantially identical to the implement of FIGS. 1 to 3 except for the provision, at the front thereof with respect to the direction A, of a guide member 35 that is of shallow V-shaped configuration when seen in plan view (FIG. 4), the point of the V being located foremost at a position substantially midway across the width of the implement. Two lugs 37 project forwardly from the leading limb of the bar 23 of the soil working member 22 in parallel relationship with the direction A, said lugs 37 being located at two points which are approximately midway between the center of the bar 23 and its opposite ends respectively. Horizontally aligned pivot pins 36 are fastened to the lugs 37 and further lugs 38 carried at the rear of the two limbs of the guide member 35 are turnably mounted on the pins 36 so that said member 35 can be turned angularly upwards and downwards about the axis which the pins 36 define. It will be noted from FIG. 4 of the drawings that the pivotal connections which are afforded by the two pins 36 are quite close to the free ends of the respective limbs of the V-shaped guide member 35. In order to avoid accidental disengagement of the lugs 38 from the pivot pins 36, known so-called "safety" pins that are of a construction which is known per se are entered through transverse bores close to the free ends of the pivot pins 36, the "safety" pins not being illustrated in the accompanying drawings. A horizontally disposed beam 40 of hollow formation and square cross-section rigidly interconnects lower plates of the coupling member of trestle 31 in parallel relationship with the frame portion 1 and carries, substantially at its center, a pair of forwardly projecting lugs 26 (FIG. 5). The upper end of a stay 39 of adjustable length is pivoted to the lugs 26 and the lower end thereof is pivoted to a pair of lugs carried by the guide member 35 at the rear of its forwardly directed point. The stay 39 is not illustrated in FIG. 4 of the drawings in order to maintain the clarity of that Figure. A brief inspection of FIG. 5 will show that the known stay 39 comprises a central sleeve whose opposite end regions are formed with internal left-hand and right-hand screw-threads respectively, matchingly externally screw-threaded portions of rods being entered in said end regions of the sleeve. The effective length of the stay 39 can thus be increased or decreased merely by rotating the sleeve relative to the rods in an appropriate direction.

In the embodiment of FIGS. 4 and 5 of the drawings, the V-shaped guide member 35 is comprised principally by a beam of channel-shaped cross-section whose base is disposed in an upright position at the front of the member with respect to the direction A and whose limbs project more or less horizontally rearwardly from the upper and lower edges of said base. The pivotal connections to the leading soil working member 22 that are defined principally by the pivot pins 36 are located outwardly beyond the rear wheels of the tractor or other vehicle which tows and operates the implement (see FIG. 4) and, in operation, the guide member 35 deflects soil from a central region of the path of travel of the tractor or other operating vehicle laterally towards the opposite sides of that path of travel so that the deflected soil will fall into, and fill, or at least nearly fill, the tracks formed by the rear wheels of the tractor or other vehicle. The implement can thus operate to form a smooth seed bed in the manner that has already been described above. The stay 39 can be lengthened or shortened, as may be desired, to alter the angular disposition of the guide member 35 about the axis defined by the pins 36 and thus to direct the point of that member 35 more or less deeply into the soil. Generally speaking, the deeper the setting of the point of the member 35, the more soil will be deflected laterally by that member and vice versa. In addition to use thereof in the manner that has been described, the leading soil working member 22, whether or not combined with the guide member 35, may be employed in cultivating soil at a greater depth. It will be remembered that, in addition to being able to adjust the supports 19 relative to the supports 17, the level of the axis of rotation of the rotary supporting member 12 can be adjusted relative to that of the frame poriton 1 by changing the angular positions of the arms 11 about the axis defined by the strong pivots 10. The member 22 can also be used at a higher level which is such that it merely smooths the surface of the land immediately before that land is worked by the tines 6 of the rotary members 7.

Although various features of the soil working implements that have been described and/or that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

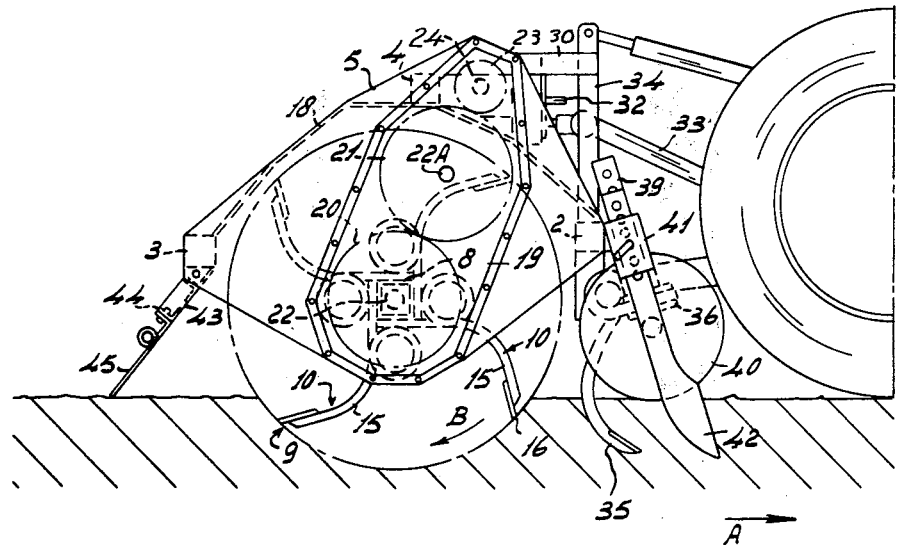

We claim:

1. A soil cultivating implement comprising a frame and a plurality of soil working rotors supported in a row on an elongated portion of said frame, said row extending transverse to the direction of implement travel, said rotors having downwardly extending tines and being rotatable about upwardly extending axes defined by corresponding shafts, driving means connected to rotate adjacent rotors in relative opposite directions, a transverse soil scraping and displacing member being connected to said frame and positioned adjacent, but spaced apart from the front side of the paths described by the tines of the rotors, said displacing member being elongated and comprising a leading cutting edge that is located at about the same horizontal level as the lower tips of said tines and substantially forwardly thereof leaving a space said displacing member being positioned to displace a layer of soil upwardly and rearwardly to fall into said space and the rotating paths of the tines of said rotors during operation, whereby the soil is deposited in a crumbled layer on a substantially unworked ground base an elongated supporting roller being interconnected to the frame and positioned to the rear of said rotors.

2. An implement as claimed in claim 1, wherein the front side of said displacing member comprises a guide for soil and has a surface extending upwardly and rearwardly relative to the direction of travel.

3. An implement as claimed in claim 2, wherein a V-shaped guide is centrally positioned in front of said displacing member with its foremost point located in the direction of travel to displace soil laterally into the path of said front side, said guide being connected to the displacing member and stay means interconnecting the guide with said frame.

4. An implement as claimed in claim 3, wherein side limbs of said guide are pivoted to said displacing member and an adjustable stay pivotably interconnects said point to said frame portion.

5. An implement as claimed in claim 1, wherein said displacing member is a bar of angular cross-section, free edges of the limbs of said bar being positioned to penetrate and scrape up a layer of ground during operation.

6. An implement as claimed in claim 1, wherein arms interconnect the rear of said frame portion to the upper portions of a support means that interconnects said displacing member to the front of the frame member.

7. An implement as claimed in claim 6, wherein said support means includes downwardly extending support elements which depend from said frame portion and fastenings releaseably secure said supports to said elements.

8. A soil cultivating implement comprising a frame and a plurality of soil working rotors suppported in a row on an elongated portion of said frame, said row extending transverse to the direction of implement travel, said rotors having downwardly extending tines and being rotatable about upwardly extending axes defined by corresponding shafts, driving means connected to rotate adjacent rotors in relative opposite directions, a soil scraping and displacing member being connected to said frame and positioned adjacent, but in spaced-apart relationship from the front side of the paths described by said tines, said scraping member comprising an elongated bar that is located at about the same horizontal level as the lower tips of said tines and co-extending with said row, said bar having an angular cross-section and a leading cutting edge positioned to displace a layer of soil upwardly and rearwardly to fall into said space and the rotating paths of the tines during operation, whereby the soil is deposited in a crumbled layer on a substantially unworked ground base an elongated supporting roller being interconnected to the frame and positioned to the rear of said rotors.

9. An implement as claimed in claim 8, wherein said bar has limbs and a connecting plate extends between said limbs.

* * * * *

United States Patent [19]

van der Lely

[11] 4,113,027

[45] Sep. 12, 1978

[54] SOIL CULTIVATING IMPLEMENTS

[76] Inventor: Cornelis van der Lely, 7, Brüschenrain, Zug, Switzerland

[21] Appl. No.: 672,036

[22] Filed: Mar. 30, 1976

[30] Foreign Application Priority Data

Apr. 1, 1975 [NL] Netherlands .................. 7503821

[51] Int. Cl.² .......................................... A01B 33/02
[52] U.S. Cl. ....................................... 172/70; 172/96; 172/123; 172/708
[58] Field of Search .............. 172/118, 119, 123, 60, 172/707, 708, 70, 71, 68, 96

[56] References Cited

U.S. PATENT DOCUMENTS

| | | | |
|---|---|---|---|
| 464,561 | 12/1891 | Gasser | 172/78 |
| 2,214,702 | 9/1940 | Seaman | 172/96 |
| 2,438,707 | 3/1948 | Kropp | 172/96 |
| 2,465,488 | 3/1949 | Sears | 172/96 |
| 2,761,267 | 9/1956 | Hill | 172/708 |
| 3,545,549 | 12/1970 | Lely | 172/123 |
| 3,667,551 | 6/1972 | Lely et al. | 172/59 |

FOREIGN PATENT DOCUMENTS

| | | | |
|---|---|---|---|
| 1,228,885 | 3/1960 | France | 172/707 |
| 95,045 | 11/1959 | Norway | 172/123 |

*Primary Examiner*—Richard J. Johnson
*Attorney, Agent, or Firm*—Mason, Mason & Albright

[57] ABSTRACT

A cultivating implement has an elongated, rotatable cultivating member that is driven to rotate about a horizontal axis. The cultivating member has a central support that defines its axis of rotation and the support is polygonal in cross-section with tines resiliently fastened to each side along the length of the support. Each tine has an outer, arcuately curved portion that is fastened to an inner portion through a coil having turns located to the rear and adjacent a succeeding side relative to the direction of its rotation. The outer portion has a replaceable blade at its outer free end and different blades can be secured to that free end. A further row of fixed but resilient tines is connected to the frame in front of the rotatable member and an additional row of resilient tines is pivoted to the frame, at the rear of the rotatable member.

5 Claims, 3 Drawing Figures